United States Patent Office 3,317,596
Patented May 2, 1967

3,317,596
BICYCLIC BORAZOLE COMPOUND
James L. Boone, Fullerton, Calif., assignor to United States Borax & Chemical Corporation, Los Angeles, Calif., a corporation of Nevada
No Drawing. Filed Apr. 20, 1964, Ser. No. 361,265
1 Claim. (Cl. 260—551)

This invention relates to a novel bicyclic borozole compound and a method for preparing the novel compound.

This application is a continuation-in-part of my co-pending application Ser. No. 217,274 filed Aug. 17, 1962, now abandoned.

It is, therefore, the principal object of this invention to provide as a new composition, a B-methyl bicyclic borazole. A further object of this invention is to provide a method for preparing the new composition. Oher objects will become apparent from the following disclosure.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

This invention provides as a new composition, the bicyclic borazole of the formula

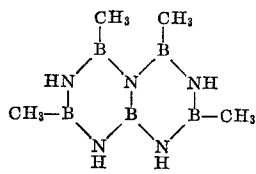

There is also provided the method which comprises combining B-trichloroborazole and methylmagnesium bromide in the presence of an ethereal solvent whereby a product mixture containing the novel bicyclic borazole is formed, and separating said bicyclic borazole from the product mixture.

The present bicyclic borazole is a white, crystalline solid, having a melting point of 60.5°–61.5° C.; it is stable at elevated temperatures, and is distillable under reduced pressure. The compound is soluble in common organic solvents such as the hydrocarbons, acetone and diethyl ether.

The B-substituted borazoles are known to be useful for many purposes, such as a component of gasoline fuels and pesticide compositions. See, for example, Groszos et al. Patent No. 2,952,645, Smalley et al. Patent No. 2,917,-543, and English et al. Patent No. 2,978,502. The borazole of the present invention is also useful as an epoxy resin curing agent.

The compound of this invention can be produced by the reaction of B-trichloroborazole with methylmagnesium bromide in an ethereal solvent, such as diethyl ether, dibutyl ether, diisopropyl ether, and tetrahydrofuran. Also, a co-solvent, such as benzene, can be used if desired. Preferably, the reactants are combined in about a 3:1 molar ratio of methylmagnesium bromide to trichloroborazole. The reactants were alowed to react at a temperature in the range of about −30° to +100° C., and preferably at a temperature of from about 25° C. to 75° C. It is desirable to keep the reaction mixture under a dry, inert atmosphere, such as dry nitrogen, to avoid contamination of the reactants and products. The present method simultaneously produces two end products, B-trimethylborazole and the desired B-methyl bicyclic borazole. The two products are separated, as for example, by fractional distillation under reduced pressure, and the desired bicyclic borazole purified by recrystallization and sublimation.

The following example illustrates the method for preparing the bicyclic borazole of this invention.

Example I

To a stirred solution of one mole of B-trichloroborazole dissolved in 475 ml. of anhydrous diethyl ether was added an ether solution (one liter) of 3 moles of methylmagnesium bromide at reflux temperature. The solution was added dropwise during an approximately 3-hour period. The mixture was stirred vigorously at reflux temperature for an additional 0.5 hour and then held for 16 hours at room temperature with no stirring. Benzene was then added continuously as the ether was removed by distillation. Approximately 3 liters of mixed solvents were distilled through a short Vigreux column before the head temperature reached 80° C. The remaining benzene slurry was then filtered at room temperature and washed with benzene. The filtrate was distilled at atmosphere pressure to remove most of the benzene and the residue then distilled under reduced pressure. B-trimethylborazole (30.85 grams) was collected at 95.2°–95.8° C./258 mm. After taking a small intermediate cut, the B-methyl bicyclic borazole (13.4 grams) was collected at 138°–139° C./25 mm. The distillation residue appeared to contain unidentified polycyclic borazole compounds.

The B-methyl bicyclic borazole was recrystallized twice from n-pentane and sublimed to give the pure product melting at 60.5–61.5° C. with the following analyses:

Calculated for $C_4H_{16}B_5N_5$: C=25.51%; H=8.56%, B=28.73%, N=37.19%, mol. wt. 188.3. Found: C=26.05%, H=8.61%, B=27.61%, N=36.82%, mol. wt. (cryoscopic in benzene) 187.9, 187.0, 191.7, 189.8.

The following example illustrates the utility of the borazole of the present invention as a curing agent for epoxy resins.

Example II

A mixture of 10 grams of UNOX–206 (described as a diepoxide of vinylcyclohexene) and 0.5 gram of the B-methyl bicyclic borazole was heated in a mold at 105°–110° C. After 16 hours, the resultant disc of cured resin had a Shore D hardness of 45–50. Heating the disc an additional 6 hours at 150—155° C. raised the Shore D hardness to 75.

When a mixture of 1.5 grams of the borazole and 10 grams of the same epoxy resin was heated for 16 hours at 105°–110° C., the resultant disc had a Shore D hardness of 75–80.

Other modes of applying the principle of the invention may be employed, change being made as regards the details described, provided the features stated in the following claim or the equivalent of such be employed.

I, therefore, particularly point out and distinctly claim as my invention:

Solid, crystalline B-methyl bicyclic borazole of the formula

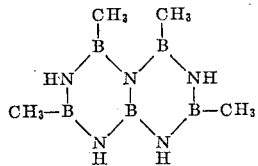

having a melting point of 60.5°–61.5° C.

References Cited by the Examiner

UNITED STATES PATENTS 3,000,937   9/1961   English et al. _____ 260—551

OTHER REFERENCES

Chem. and Eng. News, September 16, 1957, page 67.

Wiberg: Die Naturwissenschaften, volume 35, pp. 187–88 (1948).

Smolin et al.: "s-Triazines and Derivatives," pp. 601–02, Interscience Publishers, Inc. (1959).

Gould: "Borax to Boranes," Advances in Chemistry Series, Am. Chem. Soc., No. 32.

Stafiej: "Borazines," unpublished American Cyanamide Review, pp. 22–23, June 4, 1959.

WALTER A. MODANCE, *Primary Examiner.*

HARRY I. MOATZ, *Assistant Examiner.*